3,071,587
CYANOETHYL-PTERIDINES

William V. Curran and Robert B. Angier, Pearl River, N.Y., assignors to American Cyanamid Company, New York, N.Y., a corporation of Maine
No Drawing. Filed July 25, 1961, Ser. No. 126,532
5 Claims. (Cl. 260—251.5)

This invention relates to the preparation of new organic compounds. More particularly, it relates to novel substituted pteridines and methods of preparing the same.

The compounds of the present invention may be illustrated by the following formula:

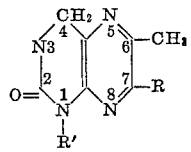

wherein R is a member of the group consisting of hydrogen or lower alkyl, R' is a member of the group consisting of lower alkyl or cyanoethyl and —N₃—C₄— is a radical of the group consisting of:

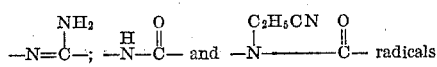

The compounds of this invention, in general, are characterized by having high decomposition points and limited solubility. Consequently, physical characteristics such as $R_f$ values in defined systems and ultraviolet absorption spectra are used for identification purposes. Generally, the compounds are white or off-white crystalline solids.

The compounds of the present invention can be prepared by reacting, for example, 2,4-dihydroxy-6,7-dimethyl pteridine or 2-hydroxy-4-amino-6-methyl pteridine with acrylonitrile to produce respectively 1,3-bis-(2-cyanoethyl) - 6,7 - dimethyl-2,4-pteridinedione or 1-(2-cyanoethyl)-4-amino-6-methyl-2(1H) - pteridinone. This reaction is generally carried out in the presence of a solvent wherein the reactants are heated at refluxing temperature for a period of from about 2 hours to 20 hours. Solvents such as a mixture of pyridine and water have given desirable results.

Other compounds of the invention, for example, 1,6-dimethyl-4-amino-2(1H)-pteridinone can be prepared by treating 2-hydroxy-4-amino-6-methyl pteridine with dimethyl sulfate in dilute sodium hydroxide. Also, compounds such as 1,6-dimethyl-4-hydroxy-2(1H)-pteridinone can be prepared by heating 1,6-dimethyl-4-amino-2(1H)-pteridinone with a concentrated mineral acid such as hydrochloric acid for a period of 15 minutes to 4 hours. In this reaction the acid acts also as a solvent and the product is recovered by evaporating the reaction mixture to dryness following the addition of water. The residue is then taken up in a solvent such as water and purified by methods well known in the chemical arts.

The compounds of the invention are valuable for their central nervous system activity having depressant properties. They can be incorporated into various pharmaceutical forms such as capsules, tablets, pills etc. for immediate or sustained use by combining with suitable carriers. They may be in the form of dosage units for a single dose or in small units for multiple doses or in larger units for division into single doses. Obviously, in addition to the therapeutically active compounds there may be present excipients, binders, fillers and other therapeutically inert ingredients necessary in the formulation of the desired pharmaceutical preparation.

The following specific examples illustrate in detail the preparation of representative compounds of the present invention. The quantities indicated are by weight unless otherwise shown.

EXAMPLE I

*1,3 - Bis(2-Cyanoethyl)-6,7-Dimethyl-2,4-Pteridinedione II*

6,7-dimethyllumaxine (2,4-dihydroxy - 6,7 - dimethyl pteridine), described by Weijlard et al., J. Amer. Chem. Soc., 67,804 (1945), (5.0 g., 26 mmoles.) is added to 100 ml. of 50% aqueous pyridine containing 10 mls. of acrylonitrile and refluxed for 11 hours. Additional 10 ml. portions of acrylonitrile are added after 3, 6 and 9 hours. After concentrating under reduced pressure, the resulting oil is crystallized from dilute ethanol; yield 6.1 g. (78%). The product is recrystallized from 80 ml. of absolute alcohol; yield 5.6 g. (72%), melting point 134–137°. $R_f$ 0.86 (dull purple fluorescence) in 0.5% $Na_2CO_3$. Ultraviolet absorption spectra in 0.1 N NaOH, $\lambda_{max.}$ 283 m$\mu$ ($\epsilon$ 8520); 0.1 N HCl, $\lambda_{max.}$ 232 m$\mu$ ($\epsilon$ 13,300), 328 m$\mu$ ($\epsilon$ 9860).

EXAMPLE II

*1 - (2-Cyanoethyl)-4-Amino-6-Methyl-2(1H)-Pteridinone*

Ten grams (56.5 mmoles.) of 2-hydroxy-4-amino-6-methylpteridine is dissolved in 500 ml. of 50% aqueous pyridine containing 20 ml. of acrylonitrile and refluxed for 9.5 hours. Ten ml. of acrylonitrile is added after 4 and 6 hours of refluxing. Evaporation of the solvent gives crystals; yield 8.2 g. The product is recrystallized from 500 ml. of 50% aqueous-ethanol; yield 6.5 g. (50%) decomposes slowly above 250° C. without melting. $R_f$ 0.82 (dull purple fluorescence) in acetone-water (8–2). Ultraviolet absorption spectra in 0.1 N NaOH, $\lambda_{max.}$ 245 m$\mu$ ($\epsilon$ 15,000), 280–284 m$\mu$ (plateau) ($\epsilon$ 3570), 346 m$\mu$ ($\epsilon$ 8500); 0.1 N HCl, $\lambda_{max.}$ 238 m$\mu$ ($\epsilon$ 14,000), 343 m$\mu$ ($\epsilon$ 8280).

EXAMPLE III

*1,6-Dimethyl-4-Amino-2(1H)-Pteridinone*

2-hydroxy-4-amino-6-methylpteridine (1.77 g., 0.01 M) is dissolved in 30 ml. of 0.5 N sodium hydroxide and 1.5 ml. (0.015 M) of dimethyl sulfate added in three equal portions over a thirty minute period with vigorous stirring. After two hours the pH has dropped to 6. The reaction mixture is chilled overnight, then filtered and washed with cold water. The wet filter cake is recrystallized as platelets from 50% aqueous alcohol; yield 1.1 g. (58%). Another recrystallization from a solution of 100 ml. of water and 50 ml. of ethanol gives 0.95 g. (50%), melting point 285–290° C. with decomposition. $R_f$ 0.69 (purple fluorescence) in butanol-5-N acetic acid (7–3). Ultraviolet absorption spectra in 0.1 N NaOH, $\lambda_{max.}$ 246 m$\mu$ ($\epsilon$ 15,900), 283–288 m$\mu$ (plateau) ($\epsilon$ 3200), 349 m$\mu$ ($\epsilon$ 8700); 0.1 N HCl, $\lambda_{max.}$ 239 m$\mu$ ($\epsilon$ 14,500), 348 m$\mu$ ($\epsilon$ 8970).

EXAMPLE IV

*1,6-Dimethyl-4-Hydroxy-2(1H)-Pteridinone*

Two hundred milligrams (1.05 mmoles.) of 1,6-dimethyl-4-amino-2(1H)-pteridinone is dissolved in 15 ml. of concentrated hydrochloric acid and refluxed for one and a half hours. The solution is evaporated to dryness under reduced pressure and again evaporated after adding 20 ml. of water. The residue is taken up in about 10 ml. of hot water, treated with activated carbon and filtered. On cooling, the compound crystallizes; yield 57 mg. Another 31 mg. (44% total) is obtained by concentrating the mother liquor. These two crops are combined and recrystallized from 8 ml. of water; yield 55 mg. (28%). $R_f$ 0.74 in 3% $NH_4Cl$, 0.78 in 0.5% $Na_2CO_3$, and 0.64 in butanol-5 N acetic acid (7–3) (purple fluorescence in all cases). Ultra-violet absorption spectra in 0.1 N NaOH, $\lambda_{max}$. 243 m$\mu$ ($\epsilon$ 18,900), 283 m$\mu$ ($\epsilon$ 2840), 343 m$\mu$ ($\epsilon$ 8800); 0.1 N HCl, $\lambda_{max}$. 233 m$\mu$ ($\epsilon$ 13,500), 336 m$\mu$ ($\epsilon$ 8250).

EXAMPLE V

2-Hydroxy-4-Amino-6-Methylpteridine 2-hydroxy-4,5,6-triaminopyrimidine sulfate [A. Bendich et al., J.A.C.S. 70, 3112 (1948)] (26.0 g., 0.11 mole) is suspended in 900 ml. of water and heated until the solid has dissolved. Sodium sulfite (260 g.) is added and the solution is cooled to 30° to give a slurry. A solution of 35 ml. of 30% methyl glyoxal and 40 g. of sodium bisulfite in 100 ml. of water is added to the slurry and the mixture is stirred for 18 hours. The solid is then collected, washed with water and dried; yield 16 g. (83%).

This product is dissolved in 250 ml. of dilute sodium hydroxide, treated with activated carbon and filtered. The filtrate is mixed with 250 ml. of 10 N sodium hydroxide and cooled. The crystalline sodium salt is collected and redissolved in 500 ml. of water which is then heated to 70° C. and acidified to pH 4; yield 9 g. (47%).

A portion (500 mg.) of this product is recrystallized from 80 ml. of water; yield 380 mg.; ultraviolet absorption spectra in 0.1 N sodium hydroxide, $\lambda_{max}$. 255 m$\mu$ ($\epsilon$ 19,000), 375 m$\mu$ ($\epsilon$ 6700); pH 7.0 buffer, $\lambda_{max}$. 242 m$\mu$ ($\epsilon$ 12,600), 282 m$\mu$ ($\epsilon$ 3700), 343 m$\mu$ ($\epsilon$ 9300); 0.1 N hydrochloric acid $\lambda_{max}$. 238 m$\mu$ ($\epsilon$11,200), 342 m$\mu$ ($\epsilon$ 8200).

We claim:
1. The compound 1,3-bis(2-cyanoethyl)-6,7-dimethyl-2,4-pteridinedione.
2. The compound 1-(2-cyanoethyl)-4-amino-6-methyl-2(1H)-pteridinone.
3. The compound 1,6-dimethyl-4-amino-2(1H)-pteridinone.
4. A compound of the formula:

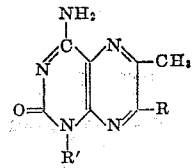

wherein R is a member of the group consisting of hydrogen and lower alkyl and R' is a member of the group consisting of lower alkyl and cyanoethyl.

5. A compound of the formula:

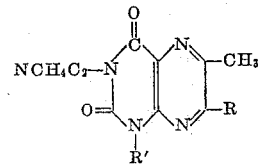

wherein R is a member of the group consisting of hydrogen and lower alkyl and R' is a member of the group consisting of lower alkyl and cyanoethyl.

References Cited in the file of this patent

Henseke et al.: Chemische Berichte, Volume 89 (1956), page 2909.

Pfleiderer: Chemische Berichte, Volume 90 (1957), pages 2582–7.